July 17, 1956 C. W. VOGT 2,754,774
APPARATUS FOR PRODUCING MEASURED PLASTIC MASSES
Filed March 29, 1950 3 Sheets-Sheet 1

INVENTOR.
CLARENCE W. VOGT.
BY Hubert E. Evans

July 17, 1956     C. W. VOGT     2,754,774
APPARATUS FOR PRODUCING MEASURED PLASTIC MASSES
Filed March 29, 1950     3 Sheets-Sheet 2
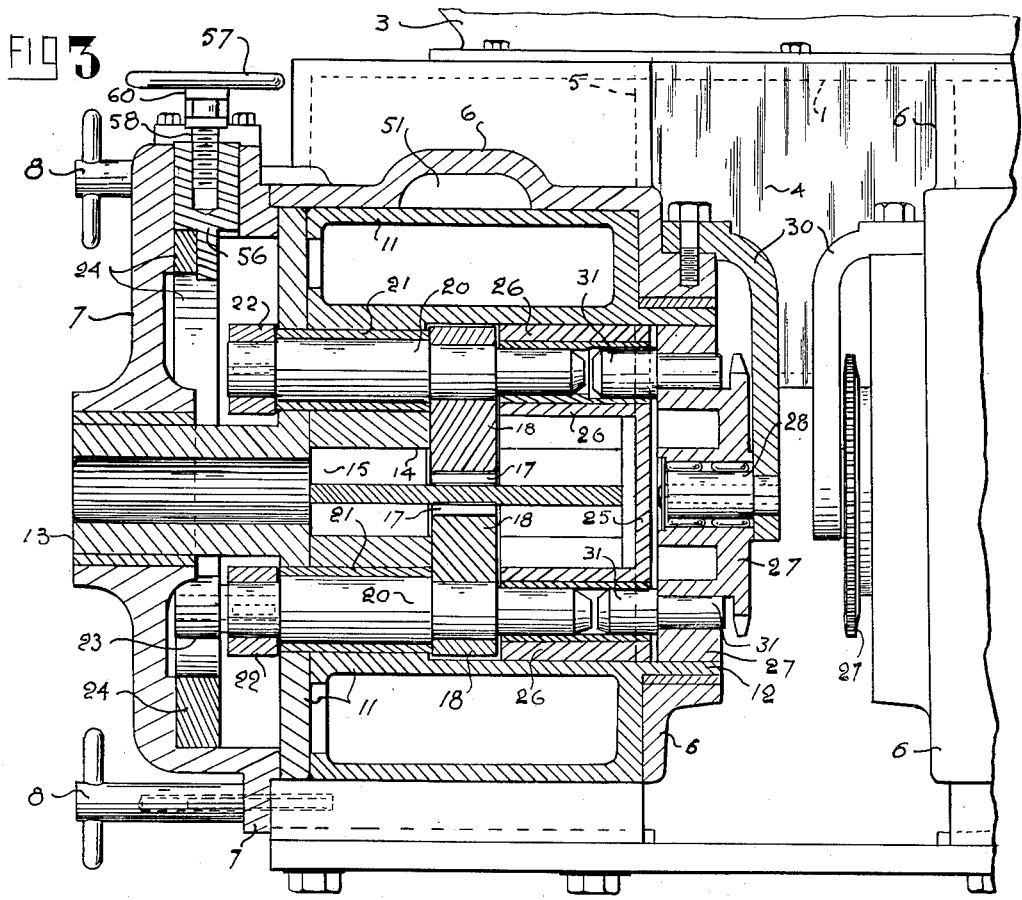
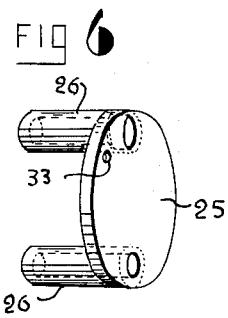
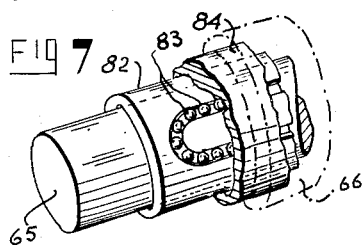
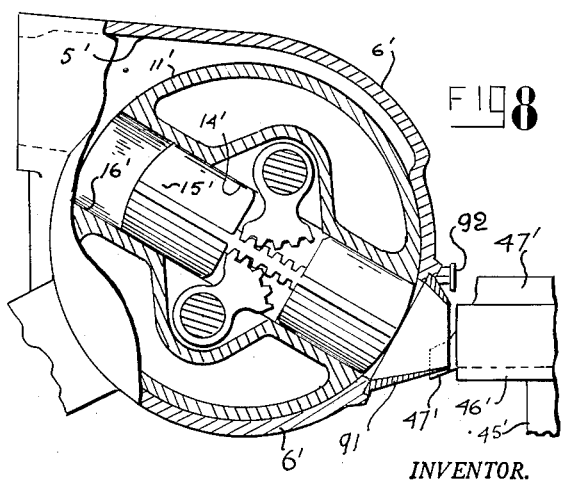
INVENTOR.
CLARENCE W. VOGT
BY Hubert E. Evans July 17, 1956  C. W. VOGT  2,754,774
APPARATUS FOR PRODUCING MEASURED PLASTIC MASSES
Filed March 29, 1950  3 Sheets-Sheet 3

INVENTOR.
CLARENCE W. VOGT.
BY
Hubert E. Evans

United States Patent Office 2,754,774
Patented July 17, 1956

2,754,774
APPARATUS FOR PRODUCING MEASURED PLASTIC MASSES

Clarence W. Vogt, Norwalk, Conn.

Application March 29, 1950, Serial No. 152,549

8 Claims. (Cl. 107—15)

This invention relates to the production of masses of plastic material and in particular to the production of accurately measured plastic masses which may be formed and deposited in condition for packaging.

It is an object of the present invention to produce measured masses of plastic material in such a way that plastic material may be advanced or flowed from a source of supply into one or more of the volumes or spaces where metering is to occur, at a substantially uniform and constant rate of flow. It is believed that feeding the plastic continuously and uniformly will contribute to greater uniformity of the plastic and accuracy of measurement of the plastic masses.

Another object is to provide for the production of measured masses of plastic material by which masses may be more accurately measured as compared to present commercial practice. In some cases, such as butter and margarine, governmental authority requires that the plastic masses contain a minimum measured amount. The attaining of greater accuracy will do away with the uncertainty of present practices, such as including an overage in each mass to insure that the minimum requirements are observed in all cases. Where the commodity is handled in a large volume, the amounts given away by the producer in the form of overage become a sizable factor and the producer cannot receive credit or be paid for the amounts given away in this manner.

Another object is to produce accurately measured plastic masses by volumetric measurement at a pressure, and therefore a density, greater than that in the feeding operation so that the effect of variations of gaseous content or voids on the variations in weight of the unit masses may be substantially reduced without maintaining the entire feeding and measuring operation at the higher pressure.

A further object is to provide a metering apparatus utilizing measuring pockets which move from intake to discharge stations and are actuated by an improved driving means to permit them to be operated continuously with a varying speed cycle, so that they may be decelerated or moved slowly through intake and discharge zones and may be accelerated or move at an increased speed between such zones. Then by arranging two or more metering mechanisms to receive the commodity from a common source, the plastic material may be fed as a continuous and uniform stream.

As will be seen later, it may be desirable to provide for additional variations in the operating cycle of the measuring cavities and it is therefore another object of the present invention to provide a driving mechanism for varying the speed within an operating cycle by which one or more variations produced at the driving end will result in the same or a predetermined multiplied number of variations within the operating cycle at the driven end of the mechanism.

A further object is to provide for the production of plastic masses by which plastic from a common source of supply is measured, formed and alternately deposited at a plurality of spaced discharge locations, so that the masses may be directly packaged, without intervening transfer operations.

A still further object is to provide for the production of measured masses of plastic material in volume production, utilizing apparatus having a relatively few moving parts in contact with the plastic material, with such parts being designed and arranged so that they are readily accessible for cleaning. In the case of food products or other plastics where cleanliness is desired or required, it is extremely important that the mechanism be accessible for cleaning.

Another object is to provide for the production of measured plastic masses in which the plastic material may be measured and formed within a stationary housing to minimize leakage problems which occur with surfaces having movement relative to each other.

A further object is to provide for the production of measured masses in a manner which is adapted to be accomplished in a closed system, and directly connected to a continuous process apparatus for producing the plastic material. If the plastic material has any internal pressure, such as for example due to the presence of entrained air or other gas, the use of a closed system may prevent the plastic material from appreciably expanding until it has been disposed in measured masses for deposition and packaging.

Other objects and advantages of the present invention will become apparent from the following detailed description, accompanied by the drawings, in which:

Fig. 3 is an enlarged sectional view taken substantially on line 3—3 of Fig. 2;

Fig. 6 is a perspective view of a member utilized in the metering mechanism shown in Fig. 3;

Fig. 7 is a fragmentary perspective view of a sliding anti-friction bearing useful in the driving means shown in Figs. 4 and 5; and Fig. 8 is a fragmentary sectional view of a slightly modified form of metering means embodying the present invention.

Figure 1:
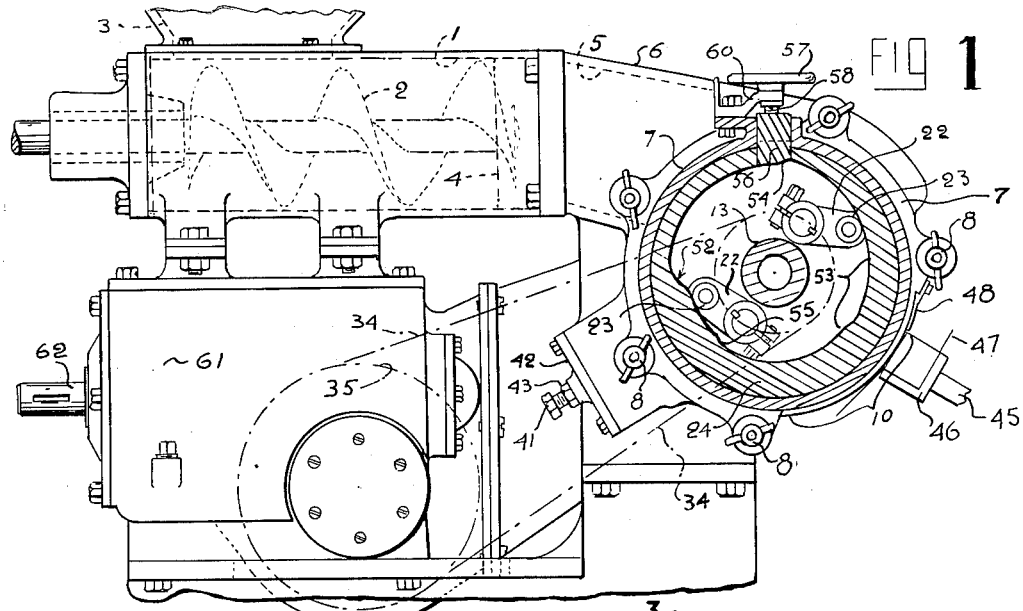
Figure 1 is an elevational view with parts broken away of a preferred form of apparatus for feeding, metering, forming, and depositing plastic masses in accordance with the present invention.

For the purpose of the present invention, the term plastic material shall be construed to include a semi-plastic or plastic or partially set or solidified substance which under the conditions at the time it is being acted on may be formed or extruded by the use of relatively low pressures. Such a material may be flowed or forced through conduits or passages by the application of pressure. However, such materials will generally not flow under the influence of gravity to an appreciable extent. Examples of plastic materials which may be formed into measured masses in accordance with the present invention are butter, margarine, cheese, lard and shortening as well as partially frozen materials such as ice cream, sherbets, etc.

In the handling of plastic materials it is extremely desirable that they be flowed substantially continuously and at a uniform and constant rate through relatively large passages. The flowing of plastic intermittently or at an uneven rate which results in pulsation will generally have an adverse effect on the composition or physical characteristics of the plastic. Such intermittent or uneven flow results in a repetitive application and release of force or pressure on the plastic material, which has a tendency to cause separation of one or more of the ingredients or may overwork and tend to break down some of the ingredients. In the case of butter or margarine such working may result in release of the water content and even a breaking down of the fatty compounds, obviously decreasing the quality of the product.

I have also found that intermittent and uneven flowing of plastic affects the accuracy of measurement of individual plastic masses. It is therefore a primary feature of the present invention to advance plastic material continuously from a source of supply and to meter the flow so that measured amounts of plastic material may be continuously and uniformly removed from the source of supply and formed into masses containing accurately measured predetermined amounts. It is also believed preferable to accomplish these results by a continuously moving mechanism. Further, to obtain accuracy in the amounts of the individual masses it is, as a practical matter, necessary to sever or remove the individual masses from the forming mechanism. This is important since the plastic materials generally have a tendency to adhere to any surface with which they come in contact, and therefore to obtain complete removal or separation the masses must be severed, sheared or wiped from the forming mechanism.

To accomplish the desired results, a plurality of sequences or series of measuring pockets or cavities may be arranged to move adjacent a common source of supply, where they receive predetermined amounts of plastic material and then to separate discharge stations at which point each pocket or cavity is caused to expel a measured amount of plastic material as a formed mass or through a forming aperture. In this way, masses may be alternately severed or removed and deposited from each of the various discharge stations for packaging. The sequence of molding pockets may be returned to the filling zone to receive additional amounts of plastic material.

By moving each sequence of measuring cavities with a variable speed operating cycle so that they move at a decelerated speed through the intake and discharge zones and at an accelerated speed between zones, plastic material may be flowed at a substantially continuous and uniform rate, being placed at all times in one or more of the measuring cavities of the various sequences. That is, as one measuring cavity of one sequence becomes filled, a measuring cavity of another sequence may be in the intake zone and start receiving plastic material. This feature is disclosed in my copending application, Serial No. 123,575, filed October 26, 1949, and entitled Apparatus for and Method of Producing Plastic Masses.

It is believed preferable to enclose the sequence or series of measuring pockets within one or more stationary housings to obviate or minimize leakage problems of plastic material from relative moving surfaces. The source of supply of plastic material may be connected to the intake port of each sequence of measuring cavities and suitable discharge stations may be provided to permit the passage of the formed masses from the housing. It is, of course, necessary to drive the sequences of measuring pockets which may be done by shafts entering the housing, but the sealing of such driving shafts is conventional and does not create a leakage problem.

It is also believed the accuracy of measurement of individual masses may be improved when it is taken into consideration that it is exceedingly difficult to supply the plastic at a uniform pressure. For example, a rotary feeding screw provides variable pressures due to the irregular amount of slippage of the screw through the plastic. Variations will also arise due to the fact that it is difficult as a practical matter to obtain a supply of plastic having a uniform consistency. Further many plastics contain a certain amount of entrained air which may vary with different lots of plastic. These difficulties may be overcome if more than the desired amount of plastic material is placed in each measuring cavity and such plastic is compressed between the intake and discharge station against a predetermined and uniform force with provision for escape of any excess plastic material. In this way the density of each measured mass of plastic material will be caused to be substantially uniform at the time of measurement. This feature is disclosed in my copending application, Serial No. 126,213, filed November 8, 1949, now Patent No. 2,666,229, dated January 19, 1954, and entitled Production of Accurately Measured Plastic Masses.

In the form of the invention shown in the drawings, the source of supply of plastic material is indicated as a conduit or passage 1 through which plastic is advanced under pressure such as by one or more helical screws 2 illustrated in Fig. 1. The plastic material may be fed to the passage 1 through a hopper, a portion of which is indicated by the numeral 3 in Fig. 1. It is also contemplated that the passage 1 may lead directly from a continuous process apparatus for making the plastic material. In such event the use of a feed screw may not be required, as often times the plastic material is discharged from the fabricating unit under pressure.

In the continuous processing of margarine, the unit discharges the product under pressure but this pressure may be greater than desired. It may therefore be desirable to utilize some means such as a feed screw operated in reverse to dissipate a portion of the pressure of the material prior to its being disposed into individual masses. The dissipation of the pressure is considered desirable for margarine, because, in addition to the lowering of the pressure, some working of the plastic material is obtained, which is believed to improve its physical properties, such as spreadability, for the ultimate consumer.

As stated, it is desirable to provide a plurality of sequences of measuring cavities which may be fed from a common source of supply and in the drawings two such sequences are disclosed. For this reason, the passage 1 may be bifurcated or subdivided, such as by the partition indicated by the numeral 4 in Figs. 1 and 3, so that the portions of the passage 1 may conjointly lead to separate inlet passages 5 of the metering means. It is also contemplated that a pair of feed screws 2 may be mounted for operation within the passage 1, although the use of two screws may not be necessary. The drawings illustrate two separate mechanisms for receiving and metering the plastic material but it will be obvious that more than two such units may be utilized or that the two units may if desired be joined so as to operate within the same housing. Since each of these units will be identical in construction except for differences due to being mounted adjacent but opposed relation, only one of the units will be described.

Figure 2:
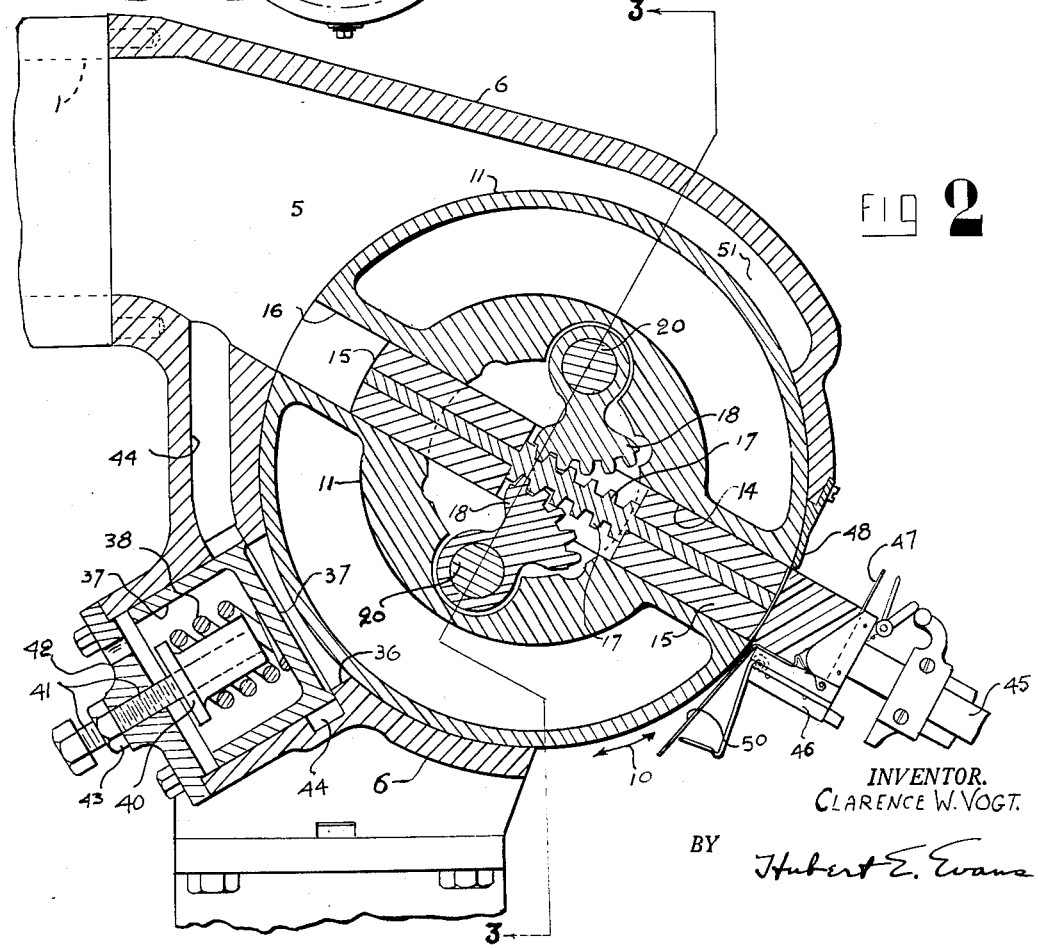
Fig. 2 is an enlarged substantially central sectional view of a portion of the apparatus in Fig. 1 for metering, forming and depositing plastic masses.

Figs. 1, 2 and 3 illustrate a stationary housing 6 supported by the frame of the apparatus at any desired height and connected with the source of supply so that the inlet passage 5 through the housing is in communication with the passage 1 of the source of supply. The housing 6 is generally cylindrical in its outer contour and its hollow interior is closed at one end by a cover or lid 7 detachably mounted to the housing and held in place by tubular shaped nuts 8 threadedly mounted on studs which extend from the housing through apertures in the cover. Diametrically opposite the inlet passage 5, the housing is provided with peripheral opening indicated generally by the numeral 10 (Figs. 1 and 2), which serves as a discharge station to permit the passage therethrough of the measured plastic masses.

Within the stationary housing is mounted a generally cylindrical shaped rotor or rotary member 11. It is provided at one end with an axially extending collar portion 12 journaled in a suitable bearing surface of the housing to provide an inner bearing for the rotary member 11 (see Fig. 3). At its opposite end an axial extension 13 of the rotor 11 is journaled in a suitable bearing surface provided by the lid or cover 7 (see Fig. 3). These bearings serve to support the rotor during operation and thus the periphery of the rotor may have a slight running clearance with the interior surface of the housing.

Extending diametrically through the rotor is a suitably formed aperture or bore 14 to accommodate, for sliding movement therein, a complementary shaped piston member 15. In the form of the invention shown in Figs. 1 through 3 the bore and piston member are rectangular in cross section. The end portions of the bore 14 in cooperation with the end faces of the piston 15 cooperatively define a pair of measuring pockets or cavities 16 opening from the periphery of the rotor at diametrically opposed locations. This provides in effect a single piston member to control or actuate the pair of measuring pockets 16, and thus the piston 15 may be said to be dual acting. Obviously, if desired a greater number of measuring pockets with individual piston members may be provided about the periphery of the rotor.

As one of the measuring pockets passes adjacent the inlet portion of the housing the piston member is caused to withdraw and the pressure of the plastic material from the source of supply in combination with the withdrawal of the piston will cause the plastic material to fill the measuring cavity 16. The rate of withdrawal of the piston is preferably arranged so that it will assist in the flow of plastic into the measuring cavity but will not be great enough to cause excessive voids which cannot be overcome by compression of the charge. At this time the opposite measuring cavity is disposed adjacent the discharge station 10 and the motion of the piston will simultaneously cause the plastic material therein to be expelled from the measuring cavity, as a formed and measured plastic mass.

The piston member may be actuated by any suitable mechanism which will provide a controlled stroke during rotary movement of the rotor 11. A very excellent mechanism for actuating the piston is illustrated in Figs. 2 and 3. The piston is provided in its central portion with a pair of rack sections 17 in back to back relationship. Meshing with the teeth of these rack sections 17 are a pair of segmental gears 18. The gears 18 are integral with or secured to spaced shafts 20 having portions which are journaled in suitable bushings 21 disposed in openings formed through the rotor 11, and extending in a direction parallel to the axis of rotation of the rotor. At their outer ends the shafts 20 have secured thereto arms 22 which also carry at their free ends roller followers 23 (see Fig. 1). The roller followers 23 are actuated or controlled by an annular cam member 24, suitably mounted on the interior of the lid or cover 7. The curvature of the cam member is appropriate to cause the desired oscillation of one of the shafts and segmental gears to cause simultaneous intake of plastic material into one of the measuring pockets and the discharge of a formed mass from the opposite measuring pocket.

As may best be seen in Fig. 3, the rotor 11 is provided with a recess or counter-bore opening from the inner end adjacent the collar portion 12 to permit insertion of the segmental gears 18 and their shafts 20. To drive the rotor 11 a driving sleeve member 25 is also insertable into the counter-bore of the rotor. This member 25 is shown in perspective in Fig. 6 and is provided with a pair of hollow cylindrical sections 26 which extend inwardly to embrace end portions of the shafts 20 which have a reduced diameter. The sections 26 may be provided with suitable bushing members to provide bearing surfaces for these end portions of the shaft members 20. The exterior surfaces of the sections 26 are received in complementary rounded surfaces on the interior of the rotor to provide in effect a key or splined engagement so that when the driving sleeve member 25 is driven it will in turn drive the rotor. Exteriorly of the member 25 is a driving sprocket member 27 which is carried by and rotates with respect to a stub shaft 28 carried by a bracket member 30 mounted on the housing 6. Preferably the stub shaft 28 is secured to the bracket member 30 and also retains the sprocket member 27 thereon so that during normal disassembly of the apparatus for cleaning purposes, the sprocket member 27 need not be removed. In this way a unit will not get out of its adjusted predetermined timing with respect to other portions of the apparatus.

Figure 4:
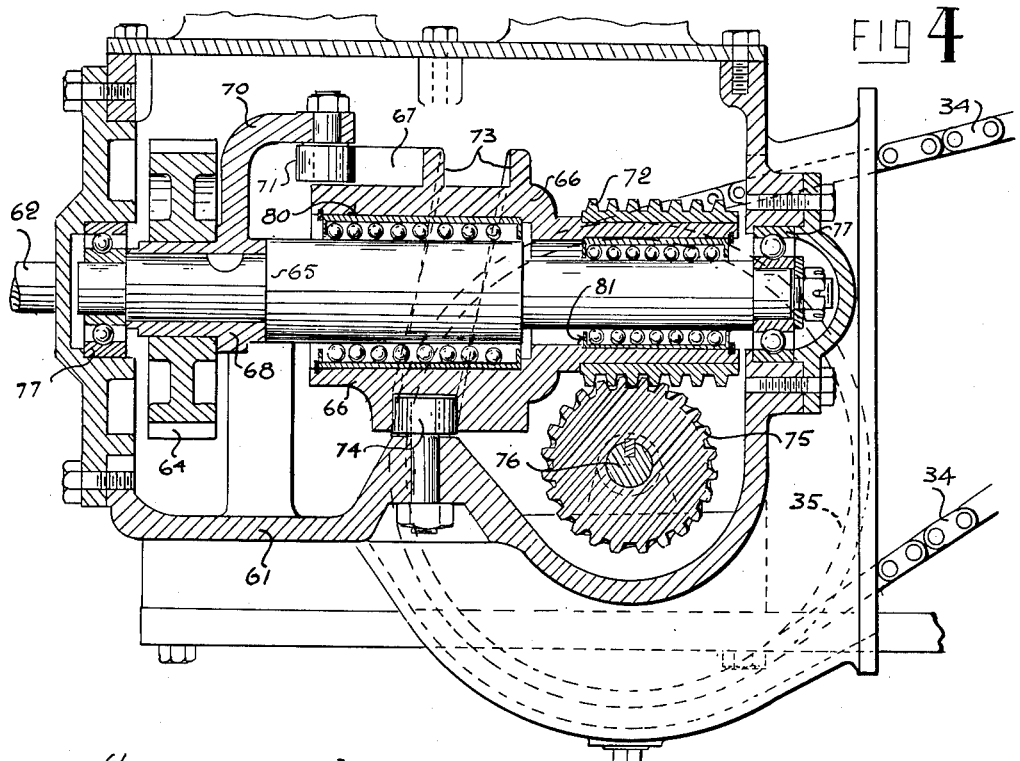
Fig. 4 is an enlarged fragmentary elevational view of a portion of the apparatus shown in Fig. 1, taken substantially on line 4—4 of Fig. 5 to illustrate a driving means for the metering mechanism.
Figure 5:
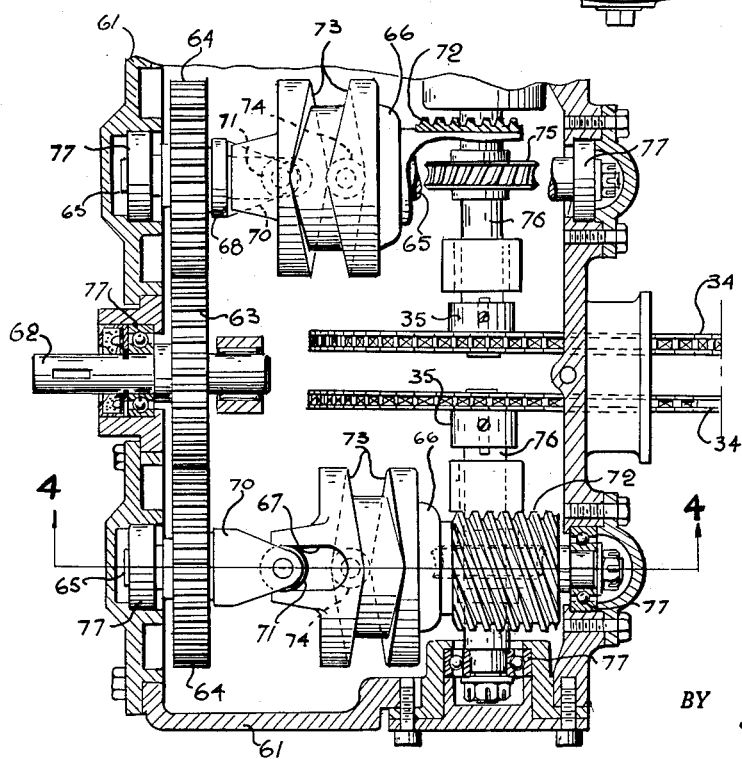
Fig. 5 is a fragmentary plan view partially in section showing details of the driving mechanism in Fig. 4.

The sprocket member 27 carries a pair of driving pins 31 which are insertable into the bushings carried by the hollow sections 26 of the driving sleeve member 25. As shown in Fig. 3 these pin members 31 may be of different size and received in different sized holes in the sleeve member 25 to assure assembly of the same parts in the same relationship. To similarly properly locate the sleeve member 25 with respect to the rotor 11, the rotor may be provided with a locating pin (not shown) which may extend into an aperture or opening 33 through the sleeve member 25 (see Fig. 6). The sprocket 27 has entrained therearound a driving chain 34 which extends to a driving sprocket 35 disposed in the driving unit for the metering mechanism (Figs. 1, 4 and 5).

To increase the accuracy of measurement of the plastic masses and at the same time to insure complete filling of each measuring cavity, it is desirable that when a measuring cavity is adjacent the inlet, the piston member be withdrawn a sufficient distance to accommodate an excess of plastic material over the desired amount of a mass to be produced. Then, before expelling the plastic mass from the measuring cavity the plastic material may be compressed against a predetermined force with provision for any excess of plastic material to escape from the measuring cavity. In this way, each resultant plastic mass is measured by being made to occupy a predetermined volume at a predetermined pressure. Since the pressure or gaseous content of the plastic material as supplied from the source of supply may vary, it is considered preferable to accomplish the compression of the plastic material in the measuring cavity at a different location than the inlet. It is also believed that greater accuracy may be obtained if the compression is accomplished at a pressure greater than that at which the material is supplied.

By way of illustration, in the production of measured masses of plastic material, such as butter, it is conventional to supply the plastic by the use of one or more feed screws. It is desirable that the feed screws be operated to supply the butter at a pressure of about 15 pounds per square inch or less. If pressures higher than this are utilized, the large area of the surface of the screw in frictional engagement with the butter may cause overworking of the plastic material with resultant adverse effects on the quality. However, churned butter contains variable amounts of entrained air and if the plastic mass is measured by being made to occupy a predetermined volume at a pressure of say 30 pounds per square inch, any variation in the density of the plastic material due to the entrained air will be minimized and appreciably lowered over the variation at 15 pounds per square inch or less. The result is that the plastic masses will be measured under conditions of uniform density with greater economy of measurement.

Figs. 1 and 2 best illustrate a mechanism for providing uniform density of the measured plastic masses. Looking at Fig. 2 it may be seen that with the rotary member 11 moving in counterclockwise direction, the walls of the housing adjacent the periphery of the rotor will seal the measuring cavity 16 as it moves away from the inlet 5. After sealing of the measuring cavity, further movement of the rotary member may advance it adjacent an opening 36 in the housing wall. This opening 36 is normally closed by a preferably cylindrical valve member 37, slidably mounted in the housing. The valve member may be cup shaped and have a relatively narrow rim portion held against the margins of the opening 36 by a coil spring 38 disposed around a member 40 carried by an adjusting stud 41 threadedly mounted in a cover 42 of the recess for the valve 37. The adjusting stud 41 may be moved to cause the coil spring 38 to urge the valve 37 into its closed position with the desired amount of force. When this has been done the adjusting stud may be locked in position by a lock nut 43. The cover 42 is suitably vented to the atmosphere, and the valve 37 and its seat designed to cause a minimum of fluctuation in the pressure exerted thereby during operating conditions.

As the measuring cavity moves into alignment with the opening 36, the piston 15 may be actuated to decrease the volume of the measuring cavity to that desired for the plastic mass to be produced. This will create a compression of the plastic material in the measuring cavity against the predetermined constant force by which the valve member 37 closes the opening 36. Any excess of plastic material over the desired amount in the measuring cavity will, by opening of the valve 37, be forced through the opening 36 and into an annular passage 44 around the valve 37, and leading through the housing 6 back to the inlet 5. Thus, any excess is returned to the system and joins plastic material coming from the source of supply. Further movement of the rotary member 11 will again cause a sealing of the measuring cavity with the desired measured amount therein and the measuring cavity will move to the discharge station where the piston may be activated to expel it as an accurately measured and formed plastic mass.

At the discharge station the piston is moved to expel the plastic material from the measuring cavity and it is considered desirable to directly deposit the plastic mass into an enwrapment for packaging. This feature is indicated in Figs. 1 and 2 by showing an arm 45 which carries a receiving member 46 and is actuated to move adjacent the discharge station. The receiving member preferably includes angularly disposed surfaces, which have previously been lined or covered with a suitable sheet material wrapper 47. As the arm 45 moves in synchronization with the rotor 11, the plastic mass may be disposed with a corner edge portion thereof at the apex of the angular surfaces of the wrapper and receiving member.

The particular form of enwrapment utilized is not an essential part of the present invention and thus is not more completely described. It is considered that a section of sheet material shaped to provide an open receiving channel is advantageous for properly receiving the plastic masses. The wrappers may be fabricated and printed in advance to carry the desired printed matter, advertising, etc., and by properly depositing the masses the completed package will have such printed matter accurately registered thereon. Uniform and attractive appearing as well as more protective packages may thus be produced, and the contents of the package may be more readily identified. My copending but now abandoned application, Serial No. 139,845, filed January 21, 1950, and entitled Enwrapments and Use of Same, discloses very satisfactory enwrapments for use with the present invention.

Since many plastic materials have a tendency to adhere to surfaces with which they come in contact it is, as a practical matter, necessary to remove or separate the plastic mass from the forming and metering means so that all of the accurately measured plastic mass will be deposited for packaging. Figs. 1 and 2 illustrate a stationary blade 48 mounted on the housing and having the leading edge closely adjacent the periphery of the rotor 11 so that as the measuring pocket is moved past the blade the plastic mass will be sheared or separated from the end face of the piston. Further movement of the arm 47 carrying the deposited plastic mass will cause the trailing flap portions 50 of the wrapper 47 to wipe across the face of the blade or knife 48 and wipe any plastic tending to adhere to this blade. This completes the deposition of the plastic mass and it may then be advanced to additional stations where the package may be formed around it by suitably folding the wrapper 47.

The measuring cavity may then be carried by movement of the rotor 11 to the inlet 5 where additional plastic material may be placed therein. As the piston is actuated to expel a formed and measured plastic mass it may be noted that the opposite end of the piston 15 is drawn into the rotor to permit filling of the opposite measuring cavity. Further, as the filled measuring cavity moves from the inlet adjacent the opening 36 where the charge of plastic material is compressed to a predetermined volume, it may be noted that the opposite end of the piston member will be slightly drawn from its position substantially flush with the periphery of the rotor to cause a slight opening of the measuring cavity at that end of the piston. To prevent any vacuum created by this withdrawing of the piston member a portion 51 of the inlet passage 5 extends to a location diametrically opposite the opening 36. Then, as the piston end is withdrawn into the rotor due to the compression of the charge in the other measuring pocket, the measuring cavity in communication with the portion 51 of the inlet will begin to be filled by plastic material.

To accomplish the above described actuations of the piston member, a suitable curvature of the interior annular surface of the cam 24, is required. Fig. 1 illustrates the contour which will produce the desired action. By the arrangement shown utilizing two racks and two segmental gears to control the piston the actuation of the piston may be obtained by influencing one of the roller followers 23 and its associated segmental gear 18. The opposite one of the roller followers is caused to move along a relieved surface of the cam track and serves to limit or prevent too great a movement of the piston member. In this way the piston may be closely controlled at all times without the use of a closed cam track. At the same time, this arrangement permits the use of a cam track having relatively easy changes in configuration and thus provides for smooth and easy operation. By acting on only one of the rollers 23 to obtain the desired piston actuation, a simplified cam construction is obtained.

In Fig. 1 the portion of the cam track curvature causing the intake of plastic material and simultaneous expulsion or extrusion is indicated by the numeral 52. The location of the corresponding relief traveled by the opposite roller follower is indicated by numeral 53. The relatively short projection indicated by the numeral 54 is the location of that portion of the cam causing the compression of the charge in the filled measuring cavity, and the location of the corresponding relief for the opposite roller follower is indicated by numeral 55.

To provide for adjustment in the measured amount of the plastic masses produced by the apparatus, it is desirable to change the contour of the cam member in the area where the piston is actuated to cause compression of the charge, that is, in the area indicated by the numeral 54. This may be done by providing a movable member 56 which forms the curvature 54 of the cam track, and as may be seen in Figs. 1 and 3 the movable member is slidably mounted in the lid or cover 7. An adjusting wheel 57 carries a stem 58 which is mounted through a bracket 60 secured to the cover 7, and has its end threadedly received in the movable member 56. By utilizing a fine pitch thread on the stem 58 a very fine adjustment of the amount of projection of the movable member 56 may be had to vary the stroke of the piston and accordingly the volume of the measuring cavity at the time the plastic mass is measured. A conventional spring-pressed detent or lock mechanism (not shown) may be provided to hold the wheel 57 in its adjusted position.

As previously stated it is desirable to actuate the rotor so that the measuring cavities are caused to move slowly through their intake and discharge zones and then to move at an increased rate in traveling between stations. To accomplish this desired motion and to obtain a substantially continuous and uniform columnar flow of plastic material from the source of supply it is preferable to provide two or more sequences of measuring cavities adjacent a common source of supply with the sequences having the same operating cycle but out of phase with each other. As a measuring cavity of one sequence ceases taking plastic material from the source of supply, a measuring cavity of the other sequence begins to receive plastic material from the source of supply.

Figs. 4 and 5 illustrate a driving unit which will provide the proper variations within the operating cycle for each of the metering heads. Since the metering heads operate out of phase with each other two identical driving units are provided, and it is believed sufficient to describe the construction and operation of only one of them. As described, the rotor member 11 is driven by the sprocket 27, which is connected by the chain 34 to a driving sprocket 35, located within the driving unit which is preferably enclosed within a casing 61 so that these driving parts may be operated in a suitable lubricating bath.

The power for the unit may be supplied from any suitable source to a main drive shaft 62 which enters the casing 61 and carries a driving gear 63 (Fig. 5). The gear 63 meshes with and drives a pair of gears 64, each of which is mounted on a driving shaft 65 for each drive unit. Also mounted on each shaft 65 is a sleeve member 66 which is provided with an axially extending guideway 67. As may best be seen in Fig. 4, the gear 64 is secured to a collar 68 keyed to the shaft 65 and the collar 68 has a projecting arm 70 carrying a roller 71 which is disposed in the guideway 67. Thus, the rotary power supplied to the gear 64 and the shaft 65 is transmitted to the sleeve 66 by the arm 70 and roller 71. The sleeve 66 carries a suitable worm 72 secured thereon and is also provided with a peripherally extending cam track 73.

The casing 61 has a stationary cam roller 74 projecting from its interior and received in the cam track 73 (see Fig. 4). During rotation of the shaft 65 and the sleeve 66, the stationary cam roller 74 acting in the cam track 73 causes axial movement of the sleeve 66 and the worm 72 along the shaft 65. The guideway 67 of the sleeve 66, in cooperation with the roller 71 permits this axial movement of the sleeve 66 while torque is being transmitted by the roller 71 to the sleeve 66. The worm 72 meshes with and drives a worm gear 75 which is mounted for rotation on a driven shaft 76 journaled in the casing 61. The driven shaft 76 also carries the driving sprocket 35 which is connected to drive the metering head by the chain 34.

It may be noted that if, during the rotation of the sleeve 66 and the worm 72, the cam track 73 angles at an angle approaching the lead angle of the worm, the axial movement of the cam and worm along the shaft 65 will prevent the worm from exerting its full driving effect on the worm gear 75, and the driven shaft 76 will rotate at a slower speed. Movement of the sleeve 66 and worm 72 in the opposite axial direction will cause the worm gear 75 and driven shaft 76 to rotate at an increased rotary speed. The angularity of the cam track 73 and the peripheral extent of the angularity of the cam track will control the amount of drive transmitted by the worm to the worm gear and will thus control the speed and the variations of speed of the driven shaft 76.

By a suitable configuration of the cam track almost any desired condition can be obtained. For example, the driven shaft 76 may be caused to dwell or pause for as long as about three-quarters of a revolution or may be made to have other deceleration and acceleration characteristics for desired time periods. Since the cam track 73 is a closed track and returns to its initial position during each revolution of the shaft 65, the driven shaft 76 will undergo a complete operating cycle for each revolution of the driving shaft 65. Further, the desired speed variations within a cycle may be transmitted by the axial movements of the sleeve 66 and worm 72 as controlled by the configuration of the cam track 73.

To decrease friction in the driving unit, the shafts 62, 65 and 76 may be journalled in suitable anti-friction roller or ball bearings as indicated by the numeral 77 in Figs. 4 and 5. This will reduce the friction during rotation of the shafts to a minimum. It is also desirable to minimize the friction due to the axial movement of the sleeve 66. To accomplish this purpose suitable lineal ball bearing bushings may be utilized between the sleeve 66 and the shaft 65 as indicated by the numerals 80 and 81 in Fig. 4. Sliding anti-friction bearings of this type are disclosed in the Ferger Patent 2,452,117, granted October 26, 1948.

A representation of this type of ball bushing is schematically shown in Fig. 7, and comprises an inner bushing sleeve 82 provided with oval or other suitably shaped raceways to accommodate a plurality of spherical bearings 83. An outer sleeve 84 encloses the unit and furnishes the central guiding portion for the enclosed oval raceways in which the balls are accommodated. The raceways are so constructed that a portion of the balls therein directly receive the load between the shaft 65 and the sleeve 66 while the balance of the balls are held out of contact with at least one of these two members. Thus, as the shaft 65 moves axially with respect to the sleeve 66, the balls under direct load roll to provide a rolling friction, causing a circulation of all of the balls in the raceway. The desired number of these raceways may be provided around the periphery of the bushing in conformity with the load, speed of shaft reciprocation, etc.

The driving unit described permits a great amount of flexibility in operating cycle and is extremely useful for obtaining the desired effects at the driven end. The variation described whereby the molding cavities are caused to move at a decelerated speed through their intake and discharge stations and at an accelerated speed therebetween may be readily changed by modifying the configuration of the cam track 73. It may be desirable, for example, to provide for decelerated travel of the molding cavities as they move adjacent the opening 36 where each charge of plastic material is compressed to a predetermined volume against a predetermined force. For some plastic materials other variations may be desirable.

With the use of a dual-acting piston, it may be seen that the rotor 11 completes an operating cycle (including the intake of a charge of plastic material), compression thereof to the desired predetermined amount and discharge of a formed mass, in one half a revolution. At the same time the driving shaft 65 may rotate one complete revolution for the same cycle and accordingly an overall reduction of 2 to 1 is desirable for the form of the invention described. For practical reasons, it is preferable that the gear reduction between the worm and the worm gear be greater.

An especially advantageous combination is to utilize a four or six thread worm with a sixteen or twenty-four tooth worm gear effecting a reduction of four to one, that is, the driving shaft 65 must make four revolutions to obtain a single revolution of the driven shaft 76. Then by selecting the sprockets 35 and 27 so that one revolution of the sprocket 35 will produce two revolutions of the sprocket 27, an appropriate overall ratio is obtained, that is, the sprocket 27 and the rotor 11 will make half a revolution (or one cycle) for each revolution of the driving shaft 65. Obviously, other ratios may be used to produce desired effects, it being important to note that by proper selection of parts and configuration of the cam track 73, the desired number of speed variations may be introduced within a revolution or cycle of the driving shaft 65 and these variations may be multiplied the desired even, odd or fractional number of times to produce an appropriate number of cycles and appropriate intra-cycle variations at the operating or driven portion of the apparatus.

It is contemplated that an excellent operating cycle is produced if each measuring cavity moves at its decelerated speed while the rotor moves for an arcuate distance of about 30° during half a revolution of the shaft 65. Thus, the filling and expulsion of plastic material may occur while the rotor and measuring cavity are moving relatively slowly. For the other half of its cycle (or 150°), the measuring cavity may be moved at its accelerated rate and the shaft 65 will make half a revolution. With the measuring cavities of the adjacent sequence moving in a similar cycle but out of phase, a measuring cavity will always be in communication with the intake station, receiving plastic material from the source of supply and a substantially continuous and uniform flow of plastic material will result. As each measuring cavity is receiving plastic material, its opposite or counterpart is adjacent the discharge station and a measured mass is being expelled therefrom.

Fig. 8 illustrates a fragmentary view of a slightly modified form of metering unit. In this form, both the aperture or bore 14' through the rotor 11' and the piston member 15' have a circular cross section. In the vicinity of the discharge station the housing 6' is closed around the rotor except for a nozzle member 91 which is mounted in the housing member 6'. The nozzle provides a forming aperture of any desired cross sectional configuration to permit the production of measured masses having varied cross sectional shapes, such as round, square, rectangular, triangular, hexagonal or even an irregular outline. Also, the nozzle member may be removably mounted, such as by soldering, to permit changing to obtain masses of various shapes but containing the desired measured amount.

In operation, a charge of plastic material may be placed in the measuring cavity 16' while it is in the region of the inlet 5' and such charge may be compressed to the desired predetermined volume. When the measuring cavity is adjacent the nozzle member 91, the measured amount of plastic material may be expelled from the measuring cavity and will cause a predetermined amount of plastic material to be forced through the forming aperture of the nozzle to provide a measured mass having the desired configuration. Preferably, the mass is deposited directly into a suitable sheet material wrapper indicated by the numeral 47'. The wrapper may be folded or formed to a V-shaped configuration to provide a receiving channel. It may be noted that in this form of the invention the extrusion through the forming aperture occurs in a direction perpendicular to the smallest cross sectional area of the resultant mass of plastic material. The wrapper member 47' may be supported in one of a series of receiving members 46' carried by an arm 45', actuated to move adjacent the nozzle member 91 so as to be disposed in position to receive the plastic mass. It is believed advantageous to have edge portions of the wrapper 47' overlap with the end portions of the nozzle and to sever or remove the plastic mass from the end face of the nozzle member a suitable blade or knife indicated by the numeral 92 may be mounted to pass adjacent the nozzle member to shear or sever the mass therefrom and complete its deposition with a corner longitudinal edge of the mass received in an apex of the V-shaped wrapper 47'. Suitable mechanism for actuating the knife member is more completely disclosed in my above-referred to copending application, Serial Number 123,575. As the knife is actuated to sever the plastic mass it may be noted that the inside surface of the knife may be wiped against the end face of the nozzle member while the opposite or outside surface of the knife may be wiped against interior edge portions of the wrapper member so that there will be no tendency for plastic material to accumulate on the knife and disturb the accuracy of measurement of the plastic masses.

It may also be noted that in this form of the invention, it is desirable that each arm 45' and receiving member 46' hesitate or pause while disposed adjacent the nozzle to receive the formed plastic masses. A driving mechanism similar in principle to that illustrated in Figs. 4 and 5 may be used to advantage to obtain the desired pause or dwell. For example the arms 45' may comprise radial spokes of a rotary member driven by such a driving unit. The cam track of the driving unit may have one or more portions angling with the same inclination as the pitch or lead of the worm, each such portion of sufficient extent to give the desired pause or dwell. The number of such cam track portions will correspond to the number of arms or spokes and depend on the overall reduction between driving and driven members. In this may the desired variable speed operating cycle for a plurality of the arms may be readily obtained.

It will be understood that in the drawings, proportions have been exaggerated in some instances to provide a greater understanding of the invention.

It will be understood that the foregoing description of preferred embodiments of the invention is for the purpose of explanation and illustration and numerous variations and modifications other than those which have been described may be made without departing from the spirit of the invention.

What I claim is:

1. In apparatus for producing measured masses of plastic material, a rotary member, a plurality of measuring cavities in said rotary member, piston members within the cavities retractable into said measuring cavities to admit and expel predetermined quantities of plastic material, means for activating said piston members including rack teeth between and connecting said piston members, segmental gears engaging the rack teeth and mounted on shafts journaled in said rotary member, and means disposed externally of said rotary member to actuate said shafts at predetermined locations in the rotation of said member.

2. In apparatus for producing measured masses of plastic material, a rotary member having an aperture therethrough, a dual acting piston member mounted for sliding movement in said aperture and having opposite end piston portions which define measuring cavities in cooperation with the aperture, said piston member thereby controlling admission of plastic material to a measuring cavity and expulsion of a measured mass therefrom, a pair of rack portions in back-to-back relationship connected between said end piston portions, a pair of segmental gears mounted for meshing engagement with said rack portions, and means for actuating said segmental gears at predetermined times during rotation of said rotary member.

3. Apparatus for producing measured amounts of plastic material which comprises a housing, a rotary member carried for rotation in said housing having an opening extending diametrically therethrough, a piston member mounted for sliding movement in said opening in the rotary member and having end piston portions which cooperate with said rotary member to provide a pair of opposed measuring cavities opening to the periphery of said rotary member, an inlet through said housing in communication with a source of supply of plastic material, an outlet through said housing opposite to said inlet, and means for actuating said piston during rotation of said rotary member, said means including rack teeth carried by said piston member, segmental gears engaging said rack teeth and mounted for pivotal movement on shafts journaled in said rotary member and extending axially through said rotary member, arms fixed to said shafts, followers carried by said arms, and a cam surface engageable with one of said followers to actuate said piston.

4. Apparatus for forming measured masses of plastic material which comprises a pair of rotary members mounted adjacent a common source of supply of plastic material under pressure, an aperture extending diametrically through each of the rotary members, a piston member mounted for reciprocation in each of the apertures and having end piston portions cooperable with the apertures in said rotary members to form measuring cavities, rack portions carried by each of said piston members, segmental gears mounted on the rotary members for meshing engagement with said rack portions, means for actuating said segmental gears at predetermined times during the rotation of each of said rotary members, and driving means for said rotary members causing each of them to rotate with predetermined intra-cycle speed variations but out of synchronization with each other whereby substantially continuous and uniform flow of plastic material from said source of supply to said measuring cavities may be obtained.

5. In apparatus for producing measured masses of plastic material and having a housing formed with an inlet in communication with a source of supply of plastic material under pressure, measuring mechanism comprising a rotary member mounted for rotation in said housing with its periphery movable adjacent said inlet, a molding cavity in the rotary member opening from the periphery thereof, a piston member in the molding cavity to control the admission and expulsion of plastic material therefrom, a discharge outlet spaced from said inlet and opening through said housing to permit expulsion of formed plastic masses therefrom, an opening through said housing adjacent the periphery of said rotary member and between said inlet and discharge, means for closing said opening with a predetermined pressure, rack teeth carried by said piston member, a segmental gear journaled on said rotary member, and means for actuating said segmental gear to cause admission of more than the desired volume of plastic material at said inlet and compression of said plastic material adjacent said opening to a predetermined volume and expulsion of a measured mass of plastic material at said discharge.

6. Apparatus for forming measured masses of plastic material which comprises a housing having a common inlet and a plurality of outlets spaced from said inlet, a source of supply of plastic material communicating with the inlet to provide substantially continuous and uniform flow of plastic material, a plurality of forming means each of which includes a rotary member mounted for rotation in said housing with its periphery communicating with said inlet and with one of said outlets, each rotary member being formed with an aperture extending diametrically therethrough with the axis of each of said apertures being in rotatable axial alignment with said inlet and an outlet of said housing corresponding to said rotary member, a piston member mounted for reciprocation in each aperture and having end piston portions which define cavities in cooperation with said apertures, said piston member thereby controlling the admission and expulsion of plastic material from the cavities formed by said piston in said rotary member, interengaging gear and rack actuating means on the rotary and piston members, respectively, to move said piston member during rotation of said rotary member, and means for driving said rotary members out of phase with each other whereby masses of plastic material are alternately disposed in said cavities and carried to said outlets for expulsion as measured masses while preserving the continuous flow of plastic material from the source of supply.

7. In apparatus for producing measured masses of plastic material and having a housing formed with diametrically opposed inlet and discharge ports, the inlet port being in communication with a source of supply of plastic material under pressure, measuring mechanism which comprises a rotary member mounted for rotation in said housing, an opening from said housing adjacent the periphery of said rotary member and between said inlet and said discharge ports, a valve member closing said opening with a predetermined pressure, a pair of apertures opening from the periphery of said rotary member at diametrically opposite locations, a piston member having end piston portions mounted for sliding movement in said pair of apertures to define measuring cavities, means to move the piston member including rack teeth carried by said piston member, a segmental gear mounted in said rotary member for oscillation and in engagement with said rack teeth, means for actuating said segmental gear while said measuring cavities are adjacent said inlet and discharge ports to admit a charge of plastic material to one of said measuring cavities and conjointly expel a measured mass from the opposite one of said measuring cavities, and adjustable means for actuating said segmental gear when a filled one of said measuring cavities is adjacent said opening to compress a charge of plastic material to a predetermined volume, said inlet port having an extended portion diametrically opposite said opening and in communication with the rotary member, whereby one of said measuring cavities is in communication with plastic material from said source of supply when the opposite one of said measuring cavities is adjacent said opening.

8. Apparatus as described in claim 7, in which there are provided two of said rotary members mounted in side-by-side relation and connected to the source of supply of plastic material under pressure, and means to actuate said rotary members out of phase to effect continuous flow of material from said source of supply.

References Cited in the file of this patent

UNITED STATES PATENTS

| | | |
|---|---|---|
| 1,131,329 | Callow et al. | Mar. 9, 1915 |
| 1,473,590 | Wallace | Nov. 6, 1923 |
| 2,351,839 | Seem | June 20, 1944 |
| 2,477,343 | Merwin | July 26, 1949 |
| 2,477,755 | Langfelder | Aug. 2, 1949 |